(12) United States Patent
Sugita

(10) Patent No.: US 9,448,662 B2
(45) Date of Patent: Sep. 20, 2016

(54) TOUCH PANEL CAPABLE OF FORMING DESIRED SHAPE AT DESIRED POSITION ON DETECTION SCREEN, ELECTRONIC DEVICE INCLUDING SAME, AND METHOD FOR DRIIVING SAME

(71) Applicant: Sharp Kabushiki Kaisha, Osaka-shi, Osaka (JP)

(72) Inventor: Yasuhiro Sugita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 100 days.

(21) Appl. No.: 14/396,086

(22) PCT Filed: Apr. 24, 2013

(86) PCT No.: PCT/JP2013/062037
§ 371 (c)(1),
(2) Date: Oct. 22, 2014

(87) PCT Pub. No.: WO2013/161867
PCT Pub. Date: Oct. 31, 2013

(65) Prior Publication Data
US 2015/0138104 A1 May 21, 2015

(30) Foreign Application Priority Data
Apr. 25, 2012 (JP) ................. 2012-100462

(51) Int. Cl.
G06F 3/01 (2006.01)
G06F 3/041 (2006.01)
G06F 3/044 (2006.01)

(52) U.S. Cl.
CPC ............ *G06F 3/0416* (2013.01); *G06F 3/016* (2013.01); *G06F 3/041* (2013.01); *G06F 3/044* (2013.01)

(58) Field of Classification Search
CPC ...... G06F 3/016; G06F 3/44; G06F 3/04812; G06F 2203/04107; G06F 2203/013–2203/015; G06F 2203/04111; G06F 2203/04112
See application file for complete search history.

(56) References Cited

U.S. PATENT DOCUMENTS

| | | | |
|---|---|---|---|
| 2007/0247429 A1 | 10/2007 | Westerman | |
| 2010/0066686 A1* | 3/2010 | Joguet | G06F 3/0412 345/173 |
| 2010/0177050 A1* | 7/2010 | Heubel | G06F 3/0416 345/173 |
| 2010/0321330 A1 | 12/2010 | Lim et al. | |
| 2012/0081333 A1 | 4/2012 | Ozeki et al. | |

(Continued)

FOREIGN PATENT DOCUMENTS

| | | | | |
|---|---|---|---|---|
| FI | WO 2011107666 A1 * | 9/2011 | ............ | G06F 3/044 |
| JP | 11-203025 A | 7/1999 | | |
| JP | 2011-003177 A | 1/2011 | | |
| JP | 2012-079134 A | 4/2012 | | |
| WO | 2011/055474 A1 | 5/2011 | | |

OTHER PUBLICATIONS

Official Communication issued in International Patent Application No. PCT/JP2013/062037, mailed on Jul. 2, 2013.

*Primary Examiner* — Sanghyuk Park
(74) *Attorney, Agent, or Firm* — Keating & Bennett, LLP

(57) ABSTRACT

The present invention provides a touch panel module capable of forming a desired shape in a desired position on a detection screen.
An applied voltage controlling section causes deformation of the detection screen 11, by applying a voltage to at least a part of a region between a first electrode 12 and a second electrode 34 so as to deform a portion of a deformable member 20 which portion corresponds to the part of the region to which part the voltage is applied.

5 Claims, 17 Drawing Sheets

(56) References Cited

U.S. PATENT DOCUMENTS

2012/0105333 A1* 5/2012 Maschmeyer .......... G06F 3/016
                                                    345/173
2012/0154299 A1* 6/2012 Hsu ........................ G06F 3/041
                                                    345/173
2012/0162108 A1* 6/2012 Chan ................... G02F 1/13338
                                                    345/173
2012/0218485 A1   8/2012 Chikama et al.
2012/0327004 A1* 12/2012 Mikladal ................. G06F 3/044
                                                    345/173

* cited by examiner (a)

(b)

(a)

(b)

(a)          (b)

(a)

(b)

(a)

(b)

TOUCH PANEL CAPABLE OF FORMING DESIRED SHAPE AT DESIRED POSITION ON DETECTION SCREEN, ELECTRONIC DEVICE INCLUDING SAME, AND METHOD FOR DRIIVING SAME

TECHNICAL FIELD

The present invention relates to a touch panel module, an electronic device including the touch panel module, and a method for driving the touch panel module.

BACKGROUND ART

Touch panels have a feature that an operation can be carried out by a direct touch on a screen. The touch panels are currently utilized for mobile phones, ATMs of financial agencies, and the like.

However, such a touch panel has a flat screen as a screen on which a user of the touch panel touches. Therefore, for example, in a case where a user is to enter characters, it is difficult to find out a position of a key and the like, as compared to character entry with use of a conventional keyboard. This tends to cause an erroneous input and the like.

Presently, there is a touch panel that has been developed by giving a haptic feedback function to a touch panel used for a mobile phone etc. Haptic feedback gives a haptic response to a user, in accordance with a usage condition of a touch panel of the user. For example, when a user uses a keyboard displayed on a screen of a mobile phone, the haptic feedback presents unevenness in accordance with positions of keys so that a position of each key is notified to the user, and thereby gives the user a sense of touching a real keyboard. This makes it possible to prevent the above-described erroneous input.

Patent Literature 1 discloses a technique that provides projections having a shape corresponding to a keyboard shape, on a screen at the time when an operation is carried out on a touch panel. FIG. 19 is a cross sectional view illustrating a touch panel of Patent Literature 1.

As illustrated in FIG. 19, the touch panel of Patent Literature 1 is provided with a pillar 504 having an uneven shape below a screen. Then, when a user is to carry out an operation such as character entry by use of a keyboard on the screen, the pillar 504 rises and provides an uneven shape of the pillar on a surface. This makes it possible to form a keyboard shape such as dots or edges. This improves usability of the touch panel.

CITATION LIST

Patent Literature

Patent Literature 1
US 2007/0247429 A1 (Publication Date: Oct. 25, 2007)

SUMMARY OF INVENTION

Technical Problem

However, the technique of Patent Literature 1 cannot form a desired shape in a desired position on a touch panel screen.
More specifically, in the touch panel described in Patent Literature 1, a position where the uneven shape is provided is defined in advance. This is because the pillar 504 for providing a keyboard shape is mechanically formed integrally with the touch panel.

Further, the pillar 504 is provided as an aid for keyboarding so as to provide a keyboard shape, and lacks expression diversity in haptic feedback such as a click feeling, a press feeling, and a texture feeling such as roughness or smoothness.

Further, holes are provided, as sections where the pillar is movable, to a surface cover of the touch panel. Accordingly, light is refracted at boundaries of the holes in the surface cover that is transparent. In addition, a gap is produced between the holes and the pillar 504. This deteriorates display quality.

The present invention is attained in view of the above problems. An object of the present invention is to provide a touch panel module that is capable of suppressing deterioration in display quality and at the same time, forming a desired shape in a desired position on a detection screen of the touch panel module.

Solution to Problem

In order to solve the above problems, a touch panel module of the present invention detecting a position of a detection target object, the touch panel module includes: a detection screen; a first electrode provided on a back surface of the detection screen; a second electrode provided so as to face the first electrode; a deformable member that deforms in response to application of a voltage, the deformable member being provided between the first electrode and the second electrode; and an applied voltage controlling section that controls the voltage applied between the first electrode and the second electrode, by controlling a potential of at least either one of the first electrode and the second electrode, the applied voltage controlling section causing deformation of the detection screen, by applying the voltage to at least a part of a region between the first electrode and the second electrode so as to deform a portion of the deformable member which portion corresponds to the part of the region to which part the voltage is applied, the position of the detection target object being detected relative to the detection screen, on the basis of an approach or a touch of the detection target object to the detection screen.

The above configuration makes it possible to form a desired shape in a desired position on the detection screen of the touch panel module, in accordance with a position to which a voltage is applied between the first electrode and the second electrode. This consequently makes it possible to provide an uneven shape or the like on the detection screen, for a user of the touch panel module.

Further, unlike the conventional technique, it is not necessary to provide a hole to the detection screen. This results in no deterioration in display quality.

The touch panel module may be arranged such that: the second electrode includes a plurality of lower electrodes arranged in a matrix form, the lower electrodes being respectively connected to TFTs as switching elements; and the voltage is applied to the part of the region by subjecting the lower electrodes to active matrix drive.

The above configuration makes it possible to drive the second electrode in a manner such that each of the lower electrodes is driven independently. This allows application of a voltage to a desired region in the region between the first electrode and the second electrode. Consequently, it becomes possible to form a desired shape in a desired position on the detection screen.

The touch panel module may be arranged such that: the TFTs each include a semiconductor layer which contains an oxide semiconductor.

The oxide semiconductor may be an InGnZnO oxide semiconductor (IGZO (Registered trademark)).

A TFT made with use of IGZO has a higher resistance to pressure as compared to a Si TFT. This makes it possible to apply a high voltage to the lower electrodes. Accordingly, the deformable member can be deformed to an extent that allows a user to feel deformation of the detection screen, by applying a high voltage to the deformable member.

Further, a TFT made with use of IGZO has a low-leakage characteristic. Accordingly, it is possible to carry out drive at an extremely low frequency of, for example, 0.01 Hz. This makes it possible to achieve low power consumption.

The touch panel module may be arranged such that the lower electrodes each have no auxiliary capacitor.

In the above configuration, when the TFT is not selected, the lower electrode is floating and coupled to the first electrode. Accordingly, even when a voltage is applied to the first electrode, the potential of the lower electrode follows the potential of the first electrode and therefore, no change in potential of the deformable member occurs. This makes it possible to suppress an unintended deformation of the deformable member.

The touch panel module may be arranged to further include: transparent gate lines provided to the second electrode and each connected to gate electrodes of corresponding ones of the TFTs; and transparent source lines provided to the second electrode and each connected to source electrodes of corresponding ones of the TFTs.

The above configuration makes it possible to improve a transmittance of the touch panel module. This makes it possible to suppress deterioration in visibility of a displayed image in a case where, for example, the display device is provided on a back side of the touch panel module.

The touch panel module may be arranged such that: the deformable member deforms due to a change in volume, when the voltage is applied.

The above configuration makes it possible to deform the deformable member, by applying a voltage to the deformable member and thereby changing a volume of the deformable member.

The touch panel module may be arranged such that: the deformable member deforms without a change in volume when the voltage is applied.

The touch panel module may be arranged such that: the deformable member is transparent.

The above configuration makes it possible to improve a transmittance of the touch panel module. This makes it possible to suppress deterioration in visibility of a displayed image in a case where, for example, the display device is provided on a back side of the touch panel module.

The touch panel module may be arranged such that: the first electrode includes (i) a plurality of drive electrodes provided parallel to each other and (ii) a plurality of sensing electrodes that are provided parallel to each other and insulated from the drive electrodes via an insulator; the drive electrodes and the sensing electrodes are arranged to be orthogonal to each other in a matrix form; and the position is detected on the basis of a change in static capacitance between the drive electrodes and the sensing electrodes.

The above configuration makes it possible to detect a position of the detection target object by a capacitive sensing method.

The touch panel module may be arranged such that: in the first electrode, a plurality of the drive electrodes are driven concurrently; and the position is concurrently detected on the basis of a change in static capacitance between the plurality of the drive electrodes concurrently driven and the sensing electrodes.

The above configuration can shorten a time required for detection. This makes it possible to realize a function of deforming the detection screen or a function of providing a rough feel or a smooth feel of the detection screen, or the like, in a period in which no detection is carried out.

The touch panel module may be arranged such that: when the deformable member is deformed, the first electrode deforms.

The above configuration allows the detection screen to easily deform due to deformation of the deformable member. This makes it possible to easily deform the detection screen.

The touch panel module may be arranged such that: the first electrode is transparent.

The above configuration makes it possible to improve a transmittance of the touch panel module. Consequently, it becomes possible to suppress deterioration in visibility of a displayed image in a case where, for example, the display device is provided on a back side of the touch panel module.

The touch panel module may be arranged such that: the applied voltage controlling section changes the voltage applied to the part of the region, at at least one frequency in a range of 1 Hz to 500 Hz.

The above configuration makes it possible to deform the deformable member at the above frequency. This makes it possible to produce vibration of the detection screen to a user by deforming the detection screen at the above frequency.

The touch panel module may be arranged such that: the deformable member is deformable by a pressure caused by a press of the detection target object on the detection screen; and the first electrode measures a magnitude of the pressure caused by the press, on the basis of a change in static capacitance formed on a back side of the drive electrodes and the sensing electrodes and between the drive electrodes and the sensing electrodes, when the deformable member deforms due to the pressure caused by the press of the detection target object on the detection screen.

This makes it possible to measure a pressure of a press that a user gives to the detection screen in a simple configuration.

Further, in order to solve the above problems, an electronic device includes the above touch panel module, the touch panel module being provided so that the detection screen is provided on a display surface side of a display device.

The above configuration allows a user of the electronic device to carry out an operation directly on a display image of the display device.

The electronic device may be arranged such that: the display device is provided with a substrate on the display surface side of the display device; and the second electrode of the touch panel module is provided on the substrate.

In the above configuration, one substrate is shared between the touch panel module and the display device. As a result, one substrate becomes unnecessary. Further, in a production process, the step of bonding the substrate can be omitted. This makes it possible to reduce a production cost of the electronic device.

The electronic device may be arranged such that: the display device is provided with a substrate on the display surface side of the display device; and the second electrode of the touch panel module is provided on a back side of the substrate.

The above configuration makes it possible to form both of electrodes etc. of the touch panel modules and electrodes etc. of the display device, on only one side of the substrate. This allows the electronic device of the present invention to be superior in handleability and yield of the substrate in a production process.

In order to solve the above problems, a method of the present invention for driving a touch panel module for detecting a position of a detection target object, the touch panel including: a detection screen; a first electrode provided on a back surface of the detection screen; a second electrode provided so as to face the first electrode, the second electrode including a plurality of lower electrodes each being connected to a TFT as a switching element, the lower electrodes being arranged in a matrix form; and a deformable member that deforms in response to application of a voltage, the deformable member being provided between the first electrode and the second electrode, the position of the detection target object being detected relative to the detection screen, on the basis of an approach or a touch of the detection target object to the detection screen, the method includes the steps of: in a pause period in which the position is not detected, deforming the detection screen, by applying a first voltage to at least a part of a region between the first electrode and the second electrode so as to deform a portion of the deformable member which portion corresponds to the part of the region to which part the voltage is applied; and in a detection period in which the position is detected, setting the TFT in a non-selected state.

The above configuration makes it possible to suppress a change in potential of the lower electrodes. Consequently, noise to the position detection function of the touch panel module can be reduced. This makes it possible to more accurately detect a position of the detection target object.

Meanwhile, in a case where a voltage is applied between the first electrode and the second electrode at the time when a position of the detection target object is being detected, there is the risk of breakage of a driver and/or a circuit. However, such risk can be reduced by the above drive method.

In addition, the deformable member can be deformed by applying a voltage between the first electrode and the second electrode in the pause period of the position detection function. This makes it possible to reduce noise to the position detection function in a single touch panel module. At the same time, it becomes possible to provide an uneven shape or the like on the detection screen for a user, by deforming the detection screen.

The method may be arranged such that: the voltage is applied to the part of the region by subjecting the lower electrodes to active matrix drive.

The above configuration makes it possible to drive the second electrode in a manner such that each of the lower electrodes is driven independently. This allows application of a voltage to a desired region in the region between the first electrode and the second electrode. Consequently, it becomes possible to form a desired shape in a desired position on the detection screen.

The method may be arranged such that: in the pause period, the voltage applied to the part of the region is changed at at least one frequency in a range of 1 Hz to 500 Hz.

The above configuration makes it possible to reduce noise to the position detection function. At the same time, it becomes possible to produce vibrations of the detection screen for a user by deforming the detection screen at the above frequency.

The method may be arranged to further include the steps of: in a case where the first electrode includes (i) a plurality of drive electrodes provided parallel to each other and (ii) a plurality of sensing electrodes that are provided parallel to each other and insulated from the drive electrodes via an insulator; and the drive electrodes and the sensing electrodes are arranged to be orthogonal to each other in a matrix form, in the pause period, setting the first electrode to a constant potential; and in the detection period, changing potentials of the drive electrodes so as to detect the position on the basis of a change in static capacitance between the drive electrodes and the sensing electrodes.

The above configuration makes it possible to detect a position of the detection target object by a capacitive sensing method, in the detection period. Further, in the pause period, while noise due to a voltage applied between the first electrode and the second electrode is reduced, the shape of the detection screen can be changed as described above.

The method may be arranged such that: in the detection period, potentials of a plurality of the drive electrodes are concurrently driven; and the position is concurrently detected on the basis of a change in static capacitance between the plurality of the derive electrodes concurrently driven and the sensing electrodes.

The above configuration can make the detection period shorter while the pause period longer. This makes it possible to deform the detection screen or to realize a function of producing a rough feel or a smooth feel of the detection screen, or the like, in the longer pause period.

The method may be arranged such that: the detection period and the pause period are alternately repeated; and the detection period is repeated at a frequency of 60 Hz or higher.

The above configuration makes it possible to detect a position at a sufficient detection frequency. This makes it possible to catch motion of a detection target object even in a case where the detecting target object moves in the vicinity of the detection screen.

The method may be arranged such that: the detection period and the pause period are alternately repeated; and the pause period is less than 16 msec.

The above configuration makes it possible to detect a position at a sufficient detection frequency. Further, a sufficient detection period can be ensured. This makes it possible to catch motion of a detection target object even in a case where the detecting target object moves in the vicinity of the detection screen. Further, it also becomes possible to accurately detect the position of the detection target object.

Advantageous Effects of Invention

As described above, a touch panel module of the present invention detecting a position of a detection target object, the touch panel module includes: a detection screen; a first electrode provided on a back surface of the detection screen; a second electrode provided so as to face the first electrode; a deformable member that deforms in response to application of a voltage, the deformable member being provided between the first electrode and the second electrode; and an applied voltage controlling section that controls the voltage applied between the first electrode and the second electrode, by controlling a potential of at least either one of the first electrode and the second electrode, the applied voltage controlling section causing deformation of the detection screen, by applying the voltage to at least a part of a region between the first electrode and the second electrode so as to deform a portion of the deformable member which portion corresponds to the part of the region to which part the voltage is applied, the position of the detection target object being detected relative to the detection screen, on the basis of an approach or a touch of the detection target object to the detection screen.

Further, as described above, a method of the present invention for driving a touch panel module includes the steps of: in a pause period in which the position is not detected, deforming the detection screen, by applying a first voltage to at least a part of the region between the first electrode and the second electrode so as to deform a portion of the deformable member which portion corresponds to the part of the region to which part the voltage is applied; and in a detection period in which the position is detected, applying, to the part of the region, a second voltage that is lower than the first voltage.

Therefore, deterioration in display quality can be suppressed. At the same time, it becomes possible to form a desired shape in a desired position on the detection screen of the touch panel module.

DESCRIPTION OF EMBODIMENTS

The following discusses embodiments of the present invention in detail.

Embodiment 1

The following discusses, with reference to FIGS. 1 through 16, an embodiment of the present invention.

<Display Device Equipped with Touch Panel>

Figure 1:
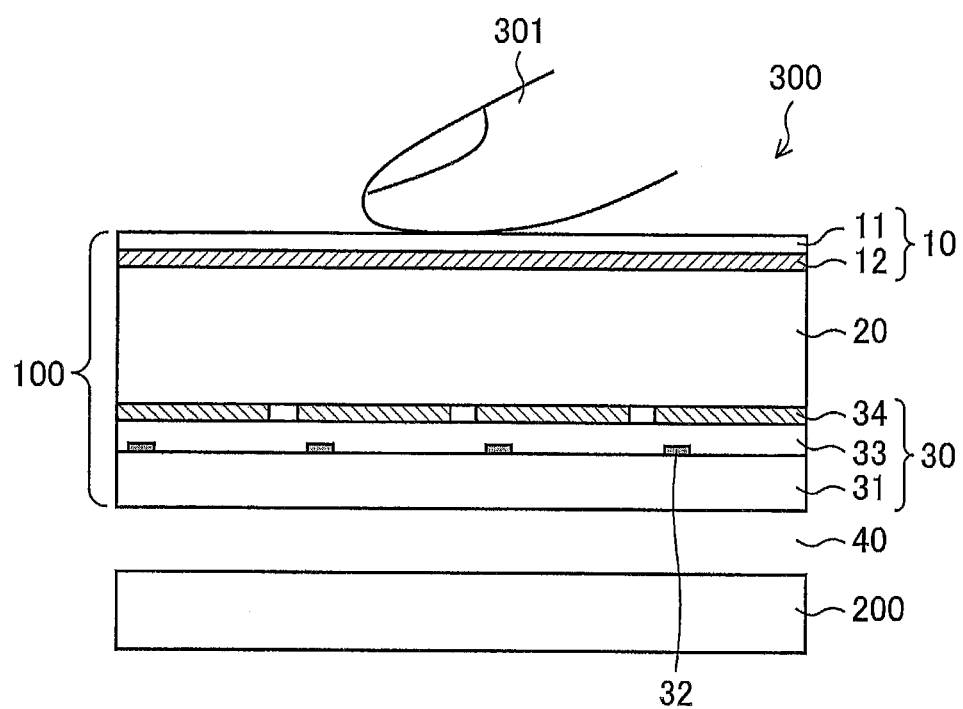
FIG. 1 is a cross sectional view of a liquid crystal display panel according to Embodiment 1 of the present invention equipped with a touch panel.

FIG. 1 is a cross sectional view of a liquid crystal display device 300 (electronic device) of the present invention equipped with a touch panel.

The display device 300 of the present invention equipped with a touch panel includes a touch panel module 100 (hereinafter, referred to as a TP module) and a display device 200. The TP module 100 is provided so that a protection film 11 of the TP module 100 is disposed on a display surface side of the display device 200. Note that Embodiment 1 describes an example case in which the display device 200 is a liquid crystal display device, but the present invention is not limited to such a configuration. For example, the display device 200 can be an organic EL display device, a plasma display, or the like.

As illustrated in FIG. 1, the TP module 100 of Embodiment 1 is provided on a display surface side of the liquid crystal display device 200 via an air gap 40. Note that the air gap 40 can be replaced with a glue.

It is preferable that the TP module 100 have a high optical transmittance so that an image displayed on a display surface of liquid crystal display device 200 is more easily viewed by a user of the liquid crystal display device 300 equipped with the touch panel.

<TP Module>

The TP module 100 of the present invention has a detection screen, and detects a position of a detection target object 301 relative to the detection screen on the basis of an approach or a touch of the detection target object 301, such as user's finger, to the detection screen.

As illustrated in FIG. 1, the TP module 100 of the present invention includes a TFT substrate 30, a deformable layer 20 (deformable member), and a detection layer 10 which are stacked in this order from a liquid crystal display device 200 side. Further, a front surface side of the detection layer 10 serves as an operation screen of the TP module 100.

As described above, the TP module 100 preferably has a high optical transmittance. Accordingly, each of the TFT substrate 30, the deformable layer 20, and the detection layer 10 preferably has a high optical transmittance.

The TP module 100 of the present invention provides haptic feedback to a user 301 of the liquid crystal display device 300 equipped with the touch panel. In order to provide the haptic feedback, the TP module 100 applies a voltage to the deformable layer 20 so as to cause deformation of the deformable layer 20, and thereby causes deformation of the detection layer 10. Accordingly, the detection layer 10 is made of a flexible member so that the detection layer 10 deforms in accordance with deformation of the deformable layer 20.

<TFT Substrate>

The TFT substrate 30 includes a TFT glass substrate 31, TFTs 32, an insulating film 33, a second electrode 34, and a wiring (not illustrated). The TFTs 32 are provided on the TFT glass substrate 31 and covered with the insulating film 33. In accordance with positions where the TFTs 32 are provided, the second electrode 34 is provided on the insulating film 33.

The second electrode 34 and each of the TFTs 32 are electrically connected to each other via a contact hole (not illustrated) formed in the insulating film 33.

Figure 2:
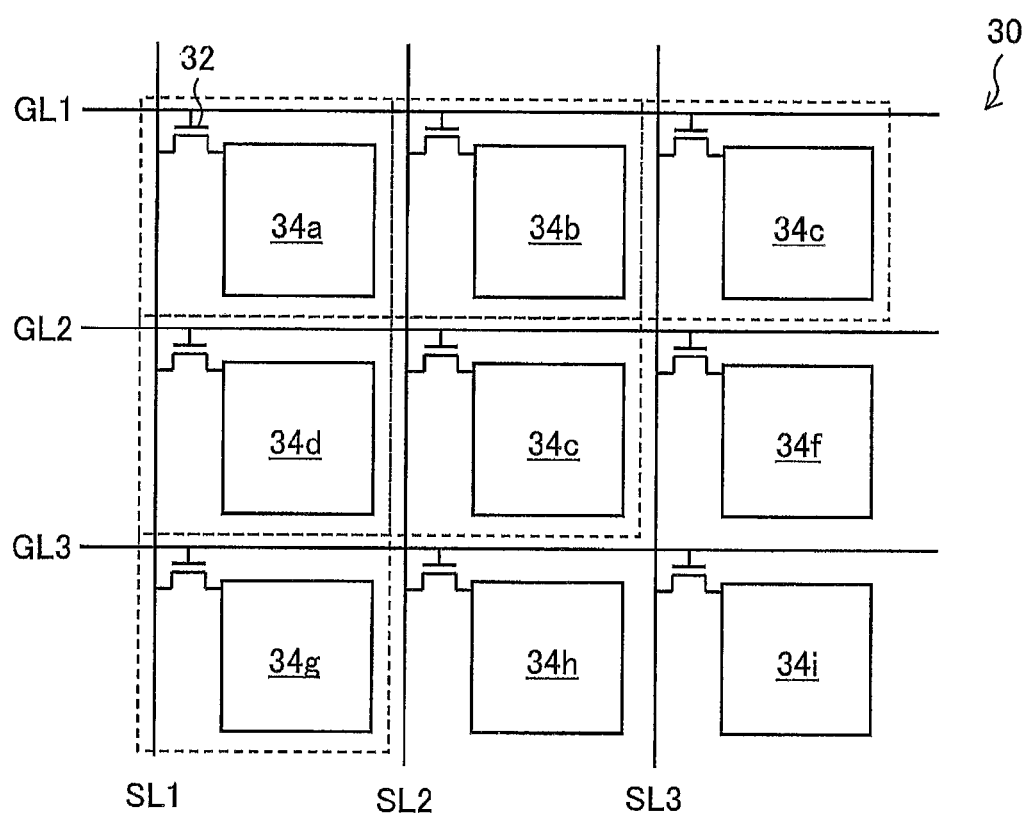
FIG. 2 is a plane view of a TFT substrate according to Embodiment 1 of the present invention.

FIG. 2 is a plane view of the TFT substrate 30. For explanation, the TFT glass substrate 31 and the insulating film 33 are not illustrated in the TFT substrate of FIG. 2. The second electrode 34 includes a plurality of lower electrodes (34a, 34b, 34c, and the like; hereinafter, 34n) arranged in a matrix form.

As illustrated in FIG. 2, (i) a plurality of gate lines GLn and a plurality of source lines SLn are provided so as to be orthogonal to each other, (ii) the TFTs 32 each are connected to a corresponding gate line GLn and a corresponding source line SLn in the vicinity of an intersection between the corresponding gate line GLn and the corresponding source line SLn, and (iii) the TFTs 32 each are connected to a corresponding lower electrode 34n.

The plurality of gate lines GLn and the plurality of source lines SLn are connected to a control section (applied voltage controlling section) (not illustrated). The control section sequentially scans the plurality of gate lines GLn each of which is connected to a gate electrode of a corresponding TFT, turns on the TFT 32 as a switching element, and applies a voltage to a corresponding lower electrode 34n via a source line SLn connected to a source electrode of the TFT. That is, the lower electrodes 34n are driven by an active matrix drive method.

Note that the order of scanning the plurality of gate lines GLn in active matrix drive of the lower electrodes 34n is not limited.

It is preferable that a semiconductor layer of each of the TFTs 32 used in the TFT substrate 30 be made with use of an oxide semiconductor. The oxide semiconductor can be, for example, IGZO (InGaZnOx). Further, the TFT substrate 30 preferably has no auxiliary capacitor, and the gate lines GLn and the source lines SLn are preferably transparent wires.

A Si TFT has a bandgap of 1.2 eV, whereas a TFT made with use of IGZO has a large bandgap, that is, approximately 3 eV. Accordingly, since the TFTs 32 made with use of IGZO each have a resistance higher than that of the Si TFT, the use of the TFTs 32 allows a high voltage (of several tens of volts to several hundreds of volts) to be applied to the lower electrodes 34n. This makes it possible to apply, to the deformable layer 20, a voltage which is higher than a voltage applied in a case where Si TFTs are used. This allows the deformable layer 20 to deform to a greater extent.

As described above, the use of IGZO for the TFTs 32 allows a variable control of a surface shape of the TP module 100 by making use of a characteristic of IGZO. The use of IGZO for the TFTs 32 also allows improvement in display quality without deteriorating an optical transmittance of the TP module 100.

Further, a TFT made with use of IGZO has a low-leakage characteristic and is able to retain a voltage for a long time, so that low power consumption can be achieved by carrying out drive at a low frequency. Further, since the TFT made with use of IGZO does not need any auxiliary capacitor (storage capacitor), it is possible to realize an active matrix structure without an auxiliary capacitor.

Since the TFT substrate 30 of Embodiment 1 has an active matrix structure, it is possible to deform a local region of the deformable layer 20. That is, it is possible to deform a part of the detection layer 10 of the TP module 100 instead of deforming a whole of the detection layer 10. Further, by repeating deformation of the deformable layer 20 at a high frequency, vibrations of the deformable layer 20 can be generated so that haptic feedback is provided by means of the vibrations.

<TFT>

An amount of electric current (that is, electron mobility) in an ON state of a TFT made with use of an oxide semiconductor is higher than that of the TFT made with use of a-Si. Specifically, the TFT made with use of a-Si has an Id current of 1 uA when the TFT is in an ON state, whereas the TFT made with use of the oxide semiconductor has an Id current of approximately 20 uA to 50 uA when the TFT is in an ON state. This shows that the electron mobility in an ON state of the TFT made with use of the oxide semiconductor is 20 to 50 times higher than that of the TFT made with use of a-Si, and the TFT made with use of the oxide semiconductor thus has an excellent ON characteristic.

Therefore, since the TP module 100 of Embodiment 1 employs the TFT which is made with use of the oxide semiconductor and, accordingly, has an excellent ON characteristic, it is possible to increase an electron mobility amount at the time of setting a potential to each lower electrode 34n. This makes it possible to shorten a time required for setting the potential.

The TFT made with use of the oxide semiconductor has a lower-leakage characteristic and a higher pressure resistance than those of the TFT made with use of a-Si. This eliminates the need for an auxiliary capacitor, allows achieving low power consumption, and makes it possible to apply a high voltage to the deformable layer 20.

<Detection Layer>

The detection layer 10 includes the protection film 11 and a first electrode 12. The protection film 11 faces a user 301 side of the liquid crystal display device 300 equipped with the touch panel. The first electrode 12 is provided so as to be opposed to the second electrode 34 and face the deformable layer 20.

That is, the protection film 11 forms the operation screen (detection screen) on which the user 301 of the liquid crystal display device 300 equipped with the touch panel carries out an operation. The protection film 11 can have a thickness of, for example, 10 μm to 100 μm.

Further, the first electrode 12 is provided on a back surface of the protection film 11 so as to be substantially parallel to the second electrode 34. The "back surface" means a surface of the protection film 11 which surface is opposite to the operation screen.

Figure 3:
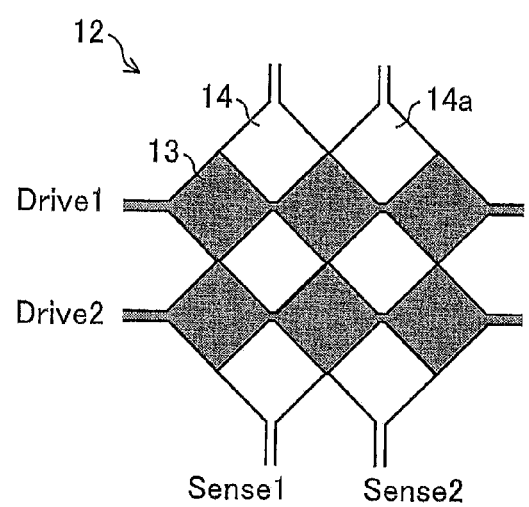
FIG. 3 is a plane view of a first electrode according to Embodiment 1 of the present invention. (a) of FIG. 3 is a schematic view and (b) of FIG. 3 is an enlarged view of a part of (a).
Figure 3:
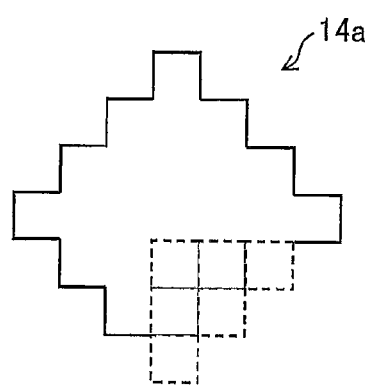

(a) of FIG. 3 is a plane view of the first electrode 12, and (b) of FIG. 3 is an enlarged view of a part of the first electrode 12. The first electrode 12 of Embodiment 1 has an electrode pattern of a mutual capacitive touch panel. In (a) of FIG. 3, a plurality of drive lines Dn (transmission lines)

are provided in a lateral direction of the first electrode 12, and drive electrodes 13 are connected to the plurality of drive lines Dn.

A plurality of sense lines Sn (reception lines) are provided in a longitudinal direction of (a) of FIG. 3, and sensing electrodes 14 are connected to the plurality of sense lines Sn.

The plurality of drive lines Dn are provided so as to be parallel to each other, and the plurality of sense lines Sn are also provided so as to be parallel to each other. The drive electrodes 13 and the sensing electrodes 14 are insulated from each other via an insulator. Further, the drive electrodes 13 and the sensing electrodes 14 are arranged to be orthogonal to each other in a matrix form. The drive lines Dn and the sense lines Sn are driven by a control section (not illustrated), and a well-known driving method can be applied.

The first electrode 12 employed in Embodiment 1 is an electrode in which the drive electrodes 13 and the sensing electrodes 14 are made of a plurality of diamond patterned electrodes. The present invention is, however, not limited to such a configuration. The first electrode 12 can be made up of drive electrodes 13 and sensing electrodes 14 each having a given shape such as a rectangular shape. The first electrode 12 of Embodiment 1 thus has a pattern which serves also as an electrode of a capacitive touch panel.

Further, a location of the first electrode 12 and a location of the second electrode 34 correspond to each other. For example, as illustrated in (b) of FIG. 3, each of diamond pattern electrodes 14*a* of the sensing electrodes 14 has an outer shape which corresponds to a layout of corresponding lower electrodes 34*n* which are provided so as to be opposed to the each of the diamond pattern electrodes 14*a*. For example, lower electrodes 34*n* indicated by a broken line in FIG. 2 each are located directly below a region indicated by a broken line in the each of the diamond pattern electrodes 14*a*.

As described above, the TP module 100 of Embodiment 1 is arranged such that the first electrode 12 includes the plurality of lower electrodes 34*n* and the second electrode 34 includes the plurality of diamond patterned electrodes. As such, by separately setting the lower electrodes 34*n* to respective potentials, it is possible to apply a voltage to a region between the first electrode 12 and the second electrode 34 which voltage varies depending on a position.

<Deformable Layer>

The TP module 100 of the present invention includes the deformable layer 20 between the first electrode 12 and the second electrode 34. The deformable layer 20 is formed with use of a material that deforms in response to application of a voltage.

The deformable layer 20 can be made of, for example, an artificial muscle layer. Specifically, the deformable layer 20 can be made of EAP (Electro Active polymer), ICPF (Ionic Conducting Polymer Film), or the like. Apart from these, the deformable layer 20 of Embodiment 1 can be any member that deforms in response to application of a voltage.

The deformable layer 20 preferably has a high optical transparency, and preferably is transparent.

The deformable layer 20 of Embodiment 1 has such a property that a volume of the deformable layer 20 decreases in response to application of a voltage. In the present invention, "deformation" of the deformable layer 20 can mean deformation which involves a volume change, or can mean deformation which involves no volume change.

Further, the deformable layer 20 can deform in response to an external pressure such as an instruction input from the user 301 of the liquid crystal display device 300 equipped with the touch panel. The deformable layer 20 can have a thickness of, for example, 10 μm to 10 mm.

Note that a thickness of the deformable layer 20 and an applied voltage are proportional to each other. Accordingly, application of a high voltage is required in a case where the deformable layer 20 is thick. Further, application of a high voltage is required in a case where large deformation is to be produced or in a case where strong vibrations are to be produced.

Example 1

An operation example in accordance with an example of the TP module 100 of Embodiment 1 is described below with reference to FIGS. 4 through 6. The TP module 100 of Embodiment 1, as a typical touch panel module, is capable of carrying out a function of detecting a position of the detection target object 301 such as user's finger on the operation screen of the TP module 100 (hereinafter, such a function is also referred to as a position detection function).

The TP module 100 of Embodiment 1 is a mutual capacitive touch panel, and detects a position of the detection target object 301 on the basis of a change in capacitance between a drive electrode 13 and a sensing electrode 14.

Figure 4:
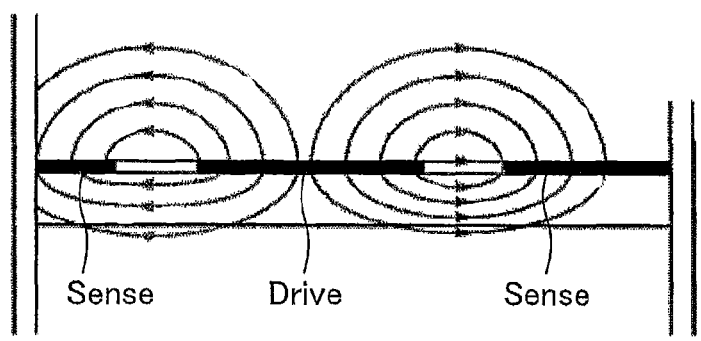
FIG. 4 is a view illustrating an operation principle of a general capacitive touch panel.
Figure 4:
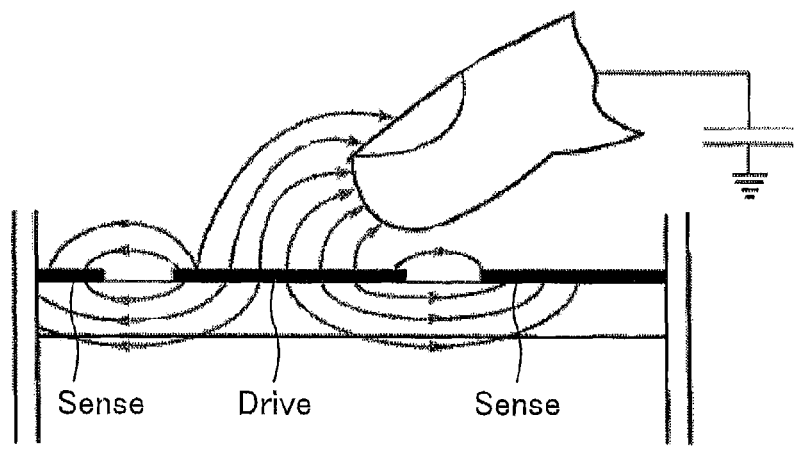

FIG. 4 is a cross sectional view of a general touch panel, for explaining a principle of a mutual capacitive touch panel. (a) of FIG. 4 is a cross sectional view of a touch panel in a state in which no detection target object is present in the vicinity of the operation screen of the touch panel. (b) of FIG. 4 is a cross sectional view of a touch panel in a state in which a detection target object is present in the vicinity of the operation screen of the touch panel.

As illustrated in FIG. 4, a capacitance between a drive electrode and a sensing electrode differs according to whether or not user's finger is present in the vicinity of the operation screen of the touch panel. A position of the detection target object can be specified by detecting such a difference (change) in capacitance by use of a detection circuit (not illustrated).

Figure 5:
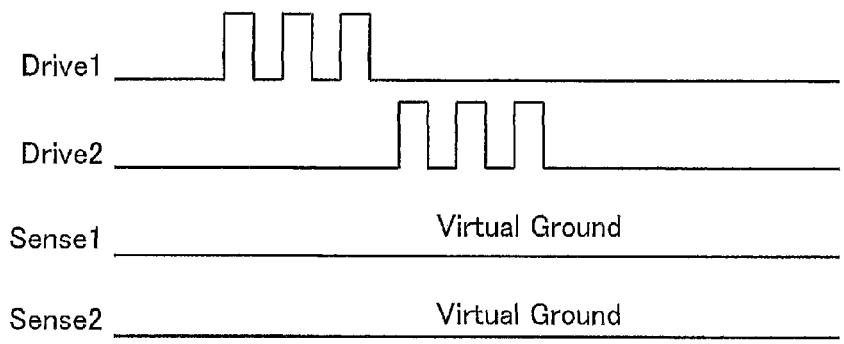
FIG. 5 is a timing chart illustrating an operation of one example of the present invention.

FIG. 5 is a timing chart illustrating signals inputted to the drive lines Dn and the sense lines Sn of the first electrode 12. A potential of the sense lines Sn is set to a ground potential. Meanwhile, voltage signals are sequentially inputted to the drive lines Dn. According to an example of FIG. 5, as the voltage signals, pulse waves are inputted to the drive lines Dn. Alternatively, sine waves may be inputted to the drive lines.

Figure 6:
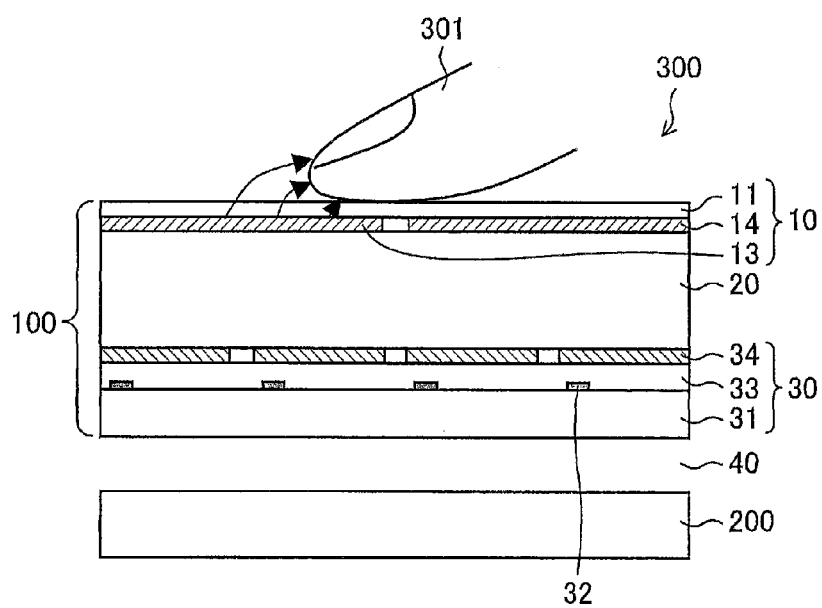
FIG. 6 a cross sectional view of a liquid crystal display device equipped with a touch panel, for illustrating one example of the present invention.

FIG. 6 is a cross sectional view illustrating the liquid crystal display device 300 equipped with the touch panel. According to the TP module 100 of Embodiment 1, as illustrated in FIG. 6, an approach to the first electrode 12 of the detection target object 301 such as a finger of a user of the liquid crystal display device 300 equipped with the touch panel causes a change in capacitance between a drive electrode 13 and a sensing electrode 14 as in the case of a conventional mutual capacitive touch panel. In accordance with the change in capacitance, coordinates of the position of the detection target object 301 on the protection film 11 can be detected.

An embodiment of the TP module 100 of the present invention is not limited to that described above. It is possible to use, as the TP module 100, a touch panel such as a surface capacitive touch panel or a resistive touch panel instead of the mutual capacitive touch panel.

As described above, the TP module 100 of the present invention is configured to deform the deformable layer 20 by applying a voltage to deformable layer 20 and thereby to deform the operation screen of the TP module 100. Therefore, the first electrode 12 provided in the detection layer 10 preferably serves as both an electrode for carrying out the position detection function and an electrode for applying a voltage to the deformable layer 20.

However, the TP module 100 of the present invention only needs to be configured to include the electrode for applying a voltage to the deformable layer 20 in the detection layer 10, and it is not always necessary to cause the electrode to detect a position. The present invention encompasses, for example, a TP module 100 having a position detection function that is carried out by an ultrasonic surface acoustic wave method.

Example 2

An operation example in accordance with an example of the TP module 100 of Embodiment 1 is described below with reference to FIGS. 7 through 10.

According to the TP module 100 of the present invention, by deforming the deformable layer 20, it is possible to provide haptic feedback to the user 301 of the liquid crystal display device 300 equipped with the touch panel. Example 2 discusses an example of a function of providing, as haptic feedback, tactility on an uneven shape in the protection film 11 (operation screen) (hereinafter, such a function is also referred to as a deformable function).

Figure 7:
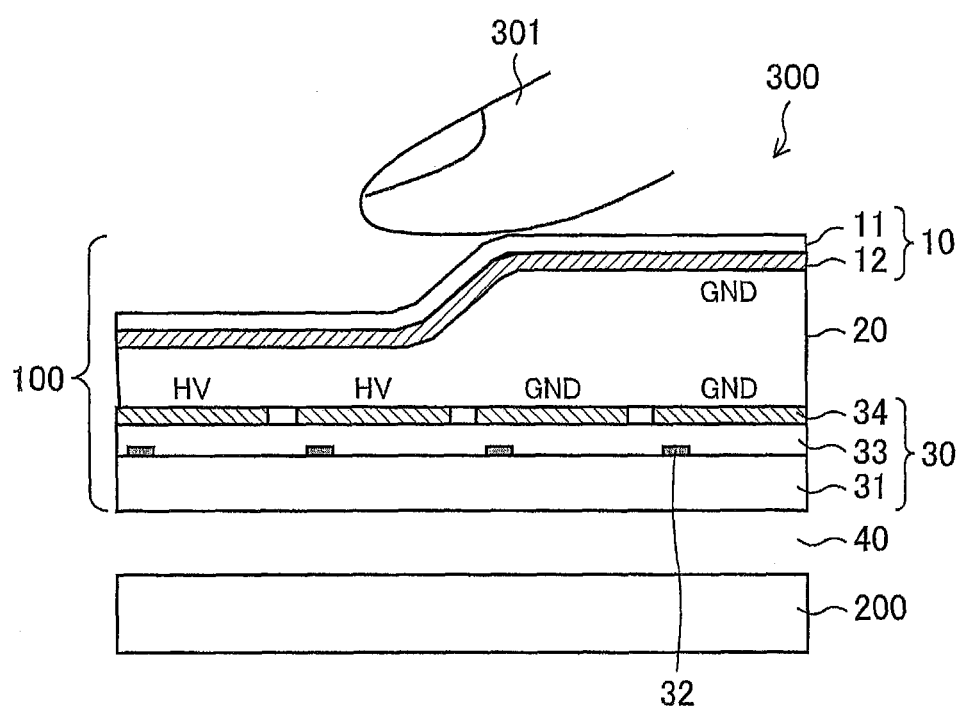
FIG. 7 is a cross sectional view of a liquid crystal display device equipped with a touch panel, for illustrating another example of the present invention.

FIG. 7 is a cross sectional view of the liquid crystal display device 300 equipped with the touch panel in a state in which the protection film 11 is deformed in accordance with Example 2.

Figure 8:
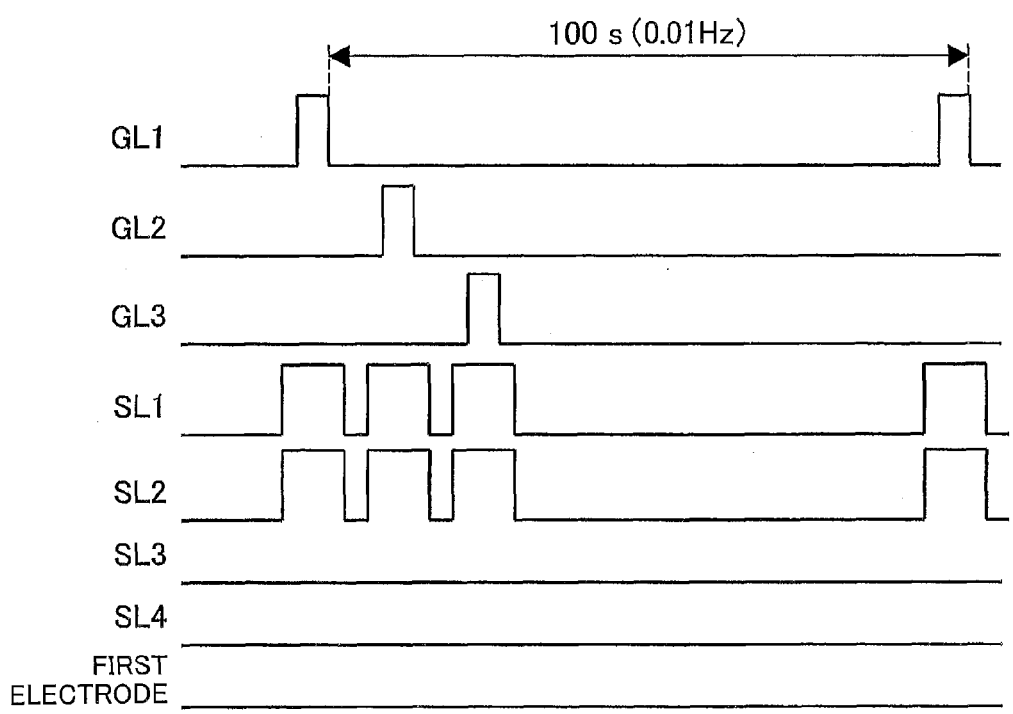
FIG. 8 is a timing chart illustrating an operation of another example of the present invention.

FIG. 8 is a timing chart illustrating voltage signals transmitted to the first electrode 12 and the second electrode 34. According to Example 2, as illustrated in FIG. 8, a potential of the first electrode 12 is set to a constant potential, and a potential of a lower electrode 34n in a desired position is changed by active matrix drive. That is, potentials of the lower electrodes 34n each are set to a given potential by sequentially scanning the gate lines GLn and applying a given voltage to the source lines SLn. This causes a change in voltage applied between the first electrode 12 and the lower electrodes 34n in accordance with a position.

According to Example 2, the gate lines GLn are scanned with a cycle time of 100 seconds. Note, however, that the gate lines GLn do not need to be scanned at a constant timing. For example, a timing at which the gate lines GLn are scanned may be changed in accordance with a state of operation by the user.

Example 2 assumes that the potential of the first electrode 12 is set to a ground potential (GND) and the potentials of the lower electrodes 34n each are set to either a high potential (HV) or the ground potential (GND).

Note, however, that the potential of the first electrode 12 does not need to be set to a constant potential but may be changed as appropriate. The potentials of the lower electrodes 34n may be set not only to two levels, which are the high potential and the ground potential, but also to various potentials. The deformable layer 20 can be deformed to various extents and it is possible to deform the operation screen in accordance with the various extents to which the deformable layer 20 deforms.

Figure 9:
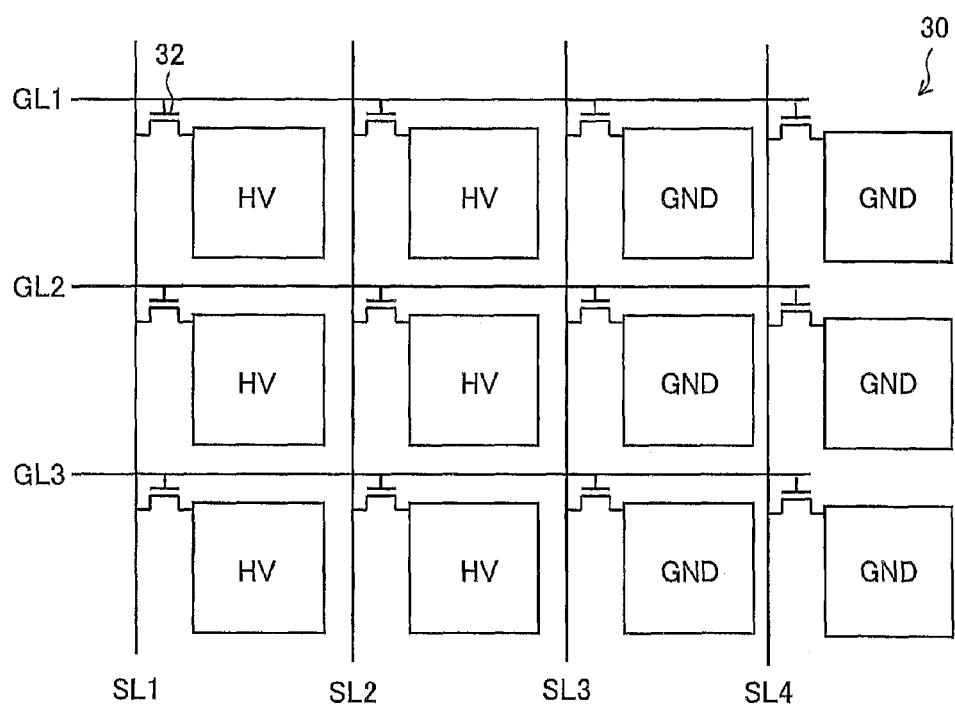
FIG. 9 is a plan view of a TFT substrate, for illustrating an operation of another example of the present invention.

FIG. 9 is a plan view of the TFT substrate 30. As illustrated in FIG. 9, a potential of a part of the lower electrodes 34n is set to the high potential (HV) and a potential of the other of the lower electrodes 34n is set to the ground potential (GND).

This causes a high voltage to be applied, in a direction perpendicular to surfaces of the detection layer 10 and the TFT substrate 30, to a part of the deformable layer 20 which part is located in a part above the lower electrodes 34n whose potential is set to the high potential (HV). The part of the deformable layer 20 to which part the voltage is applied is made smaller in thickness in the direction perpendicular to the surfaces of the detection layer 10 and the TFT substrate 30, so that the deformable layer 20 deforms. This causes deformation of the operation screen (protection film 11).

According to Example 2, by thus applying a voltage to a desired position between the first electrode 12 and the lower electrodes 34n so as to deform a desired part of the deformable layer 20, it is possible to desirably deform the protection film 11 in a desired position of the protection film 11.

The user 301 of the liquid crystal display device 300 equipped with the touch panel feels deformation of the protection film 11 with a finger. This makes it possible to realize haptic feedback.

For explanation, one lower electrode 34n is equal in size to a tip of the finger of the user 301 in FIG. 7. Note, however, that the lower electrode 34n is preferably smaller than a human finger in practice so that deformation is realized with a higher accuracy.

TFTs made with use of IGZO are used as the TFTs 32 of the TFT substrate 30. This makes it possible to apply, to the deformable layer 20, a high voltage (of several tens of volts to several hundreds of volts) which allows deformation of the deformable layer 20 to an extent that allows a human to feel deformation of the operation screen (protection film 11).

Setting the thickness of the deformable layer 20 to several ten μm or larger makes it possible to deform the operation screen to an extent that allows a human to feel deformation. Further, setting the thickness of the deformable layer 20 to approximately 10 mm makes it possible to deform the deformable layer 20 to a greater extent. This makes it possible to provide a haptic feel such as softness to the operation screen.

Furthermore, a TFT made with use of IGZO has a low-leakage characteristic. Accordingly, it is possible to carry out drive at an extremely low frequency of, for example, 0.01 Hz. This makes it possible to achieve low power consumption.

Moreover, a TFT made with use of IGZO has a low-leakage characteristic. Accordingly, it is possible to realize a pixel configuration with no auxiliary capacitor (Cs). This improves an aperture ratio and display quality (reduction in moire).

Figure 10:
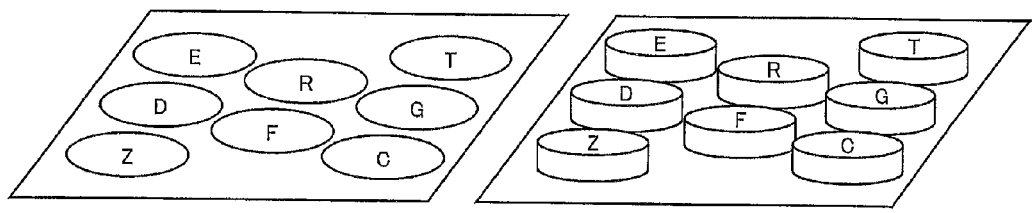
FIG. 10 is a view illustrating deformation of a surface of a TP module according another example of the present invention. (a) of FIG. 10 is a view illustrating a state prior to the deformation of the surface, while (b) of FIG. 10 is a view illustrating a state after the deformation of the surface.

FIG. 10 is a view illustrating an image of a keyboard displayed via the protection film 11 on the display surface of the liquid crystal display device 200. (a) of FIG. 10 is a view illustrating a state of the protection film 11 which is not deformed, while (b) of FIG. 10 is a view illustrating a state of the protection film 11 which is deformed. As in Example 2, deformation of the protection film 11 allows reproduction of shapes of buttons of the keyboard (allows protrusion of the buttons on the operation screen) as illustrated in FIG. 10. This makes it possible to remarkably improve operability of the TP module 100.

Note that according to the TP module 100 of Embodiment 1, a voltage applied between the first electrode 12 and the second electrode 34 is based on a voltage applied to a region between the first electrode 12 and each of the lower electrodes 34n. Therefore, in a case where the lower electrodes 34n each have a smaller area, an applied voltage can be controlled by dividing a region between the first electrode 12 and the second electrode 34 into smaller regions. This consequently makes it possible to realize deformation of the protection film 11 with a higher accuracy.

Example 3

Figure 11:
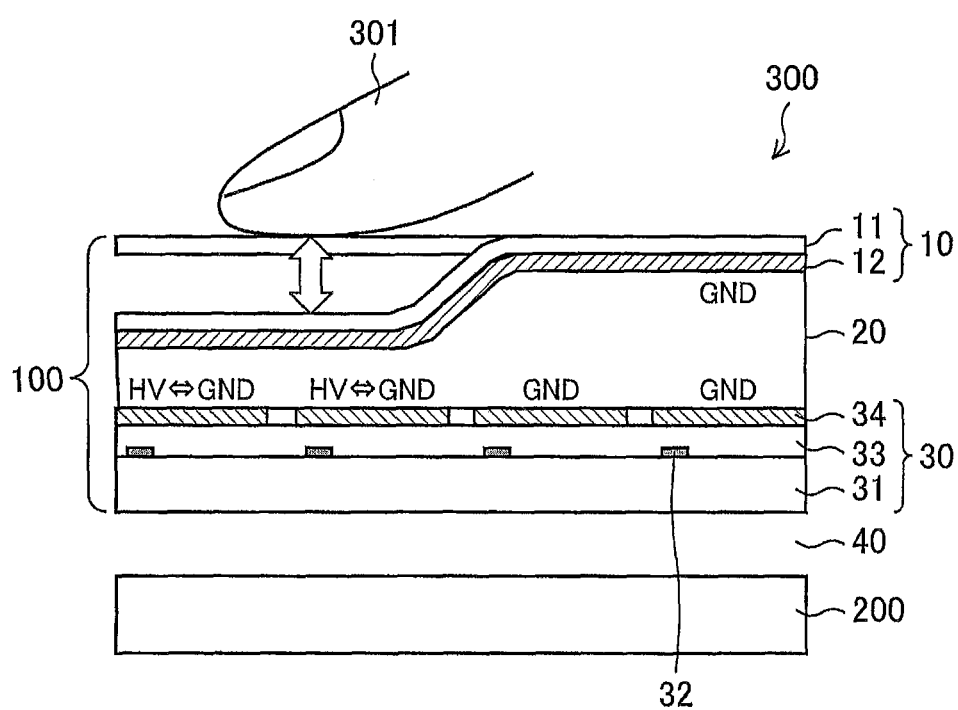
FIG. 11 is a cross sectional view of a liquid crystal display device equipped with a touch panel, for illustrating another example of the present invention.

An operation example in accordance with an example of the TP module 100 of Embodiment 1 is described below with reference to FIGS. 11 through 13.

Example 3 discusses an example of a function of providing, as haptic feedback, a haptic feel that the protection film 11 (operation screen) is vibrating (hereinafter, such a function is also referred to as a haptics vibration function). FIG. 11 is a cross sectional view of the liquid crystal display device 300 equipped with the touch panel in a state in which the protection film 11 is vibrated in accordance with Example 3. As illustrated in FIG. 11, a part of the protection film 11 which part is directly below the finger of the user 301 is vertically vibrated.

The protection film 11 is vibrated by carrying out deformation of the protection film 11 (described above) at a high speed. For example, a magnitude of the voltage applied between the first electrode 12 and the lower electrodes 34$n$ is repeatedly changed by (i) setting the potential of the first electrode 12 to a constant potential and (ii) repeatedly reversing a potential of a lower electrode 34$n$ in a desired position between a high potential (HV) and the ground potential (GND).

Figure 12:
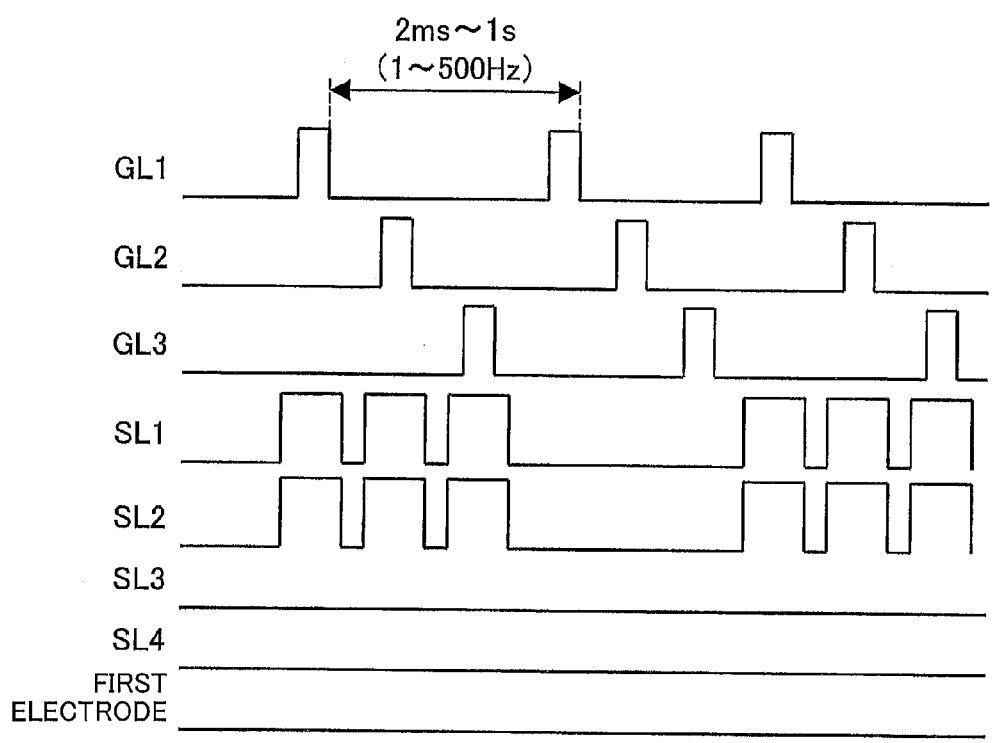
FIG. 12 is a timing chart illustrating an operation of another example of the present invention.

FIG. 12 is a timing chart illustrating voltage signals transmitted to the first electrode 12 and the lower electrodes 34$n$. According to Example 3, as illustrated in FIG. 12, the voltage applied between the first electrode 12 and the lower electrodes 34$n$ is changed by (i) setting the potential of the first electrode 12 to a constant potential, and (ii) changing a potential of a lower electrode 34$n$ in a desired position by active matrix drive. That is, potentials of the lower electrodes 34$n$ each are set to a given potential by sequentially scanning the gate lines GLn and applying a given voltage to the source lines SLn.

Example 3 assumes that the potential of the first electrode 12 is set to the ground potential (GND) and the potentials of the lower electrodes 34$n$ each are set to either the high potential (HV) or the ground potential (GND). Note, however, that the potential of the first electrode 12 does not need to be set to a constant potential but may be changed as appropriate. Further, the potentials of the lower electrodes 34$n$ may be set not only to two levels, which are the high potential (HV) and the ground potential (GND), but also to various potentials.

The potentials of the lower electrodes 34$n$ can be reversed between the high potential (HV) and the ground potential (GND) at a frequency in a range of, for example, 1 Hz to 500 Hz.

Figure 13:
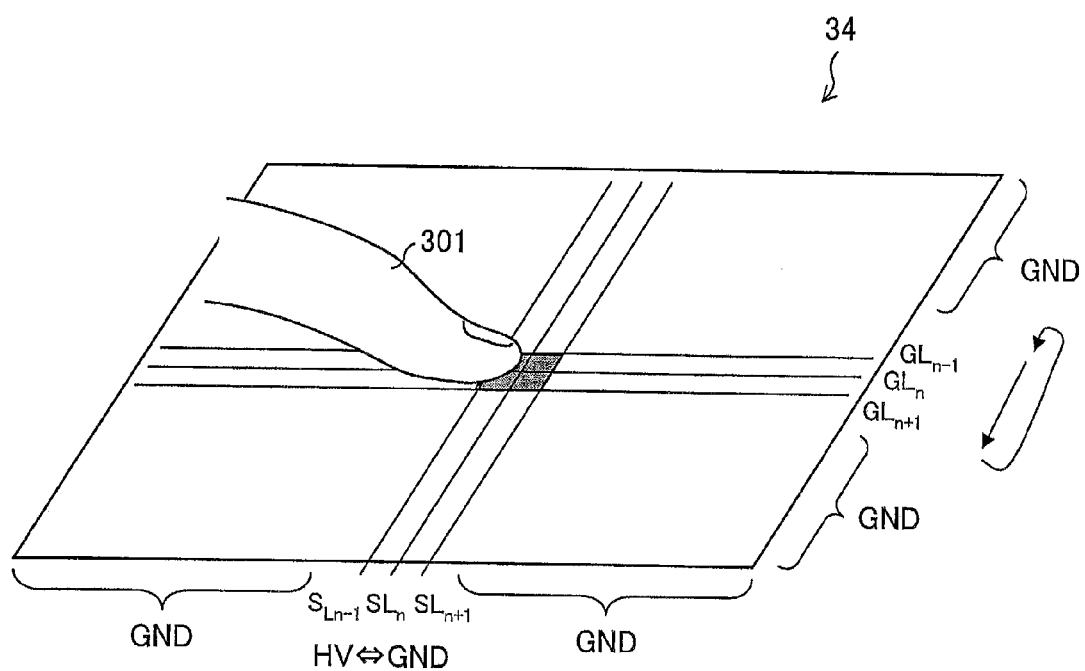
FIG. 13 is a perspective view of a second electrode, for illustrating another example of the present invention.

FIG. 13 is a perspective view illustrating the second electrode 34, for illustrating Example 3. As illustrated in FIG. 13, by selectively vibrating a part directly below a finger of the user 301, the deformable layer 20 is locally contracted. This makes it possible to provide haptic feedback to the finger 301, by vibrating the protection film 11 (operation screen) of the TP module 100.

Such a method as described above of causing local vibrations as in the TP module 100 of the present invention makes it possible to achieve lower power consumption, as compared with a conventional method in which a vibration motor is used to vibrate a touch panel module.

Further, a conventional TP module which gives vibrations by use of a vibration motor transmits vibrations to both a hand (e.g., the left hand) with which a user holds the body of the TP module and a hand (e.g., the right hand) with which the user operates the TP module. Transmission of vibrations to the hand with which the user holds the body of the TP module often causes the user to feel unpleasant.

According to the TP module 100 of the present invention, local vibration of the operation screen prevents transmission of vibrations to the hand with which the user holds the TP module 100. Further, the TP module 100 of the present invention makes it possible to solve a problem of transmission of vibrations to a hand (or a finger) in a case where the user touches the touch panel by mistake.

Note that the TFTs 32 of the second electrode 34 of the TP module 100 of Embodiment 1 each preferably have no auxiliary capacitor. In such a configuration, when the gate lines GLn are in a non-selected state (OFF), the lower electrodes 34$n$ are floating and are substantially coupled with the first electrode 12. Therefore, even when a high voltage is applied to the first electrode 12, the potential of the second electrode 34 follows the potential of the first electrode by capacitive coupling. This causes no change in voltage applied to the deformable layer 20. Therefore, the deformable layer 20 is not deformed.

Example 4

Figure 14:
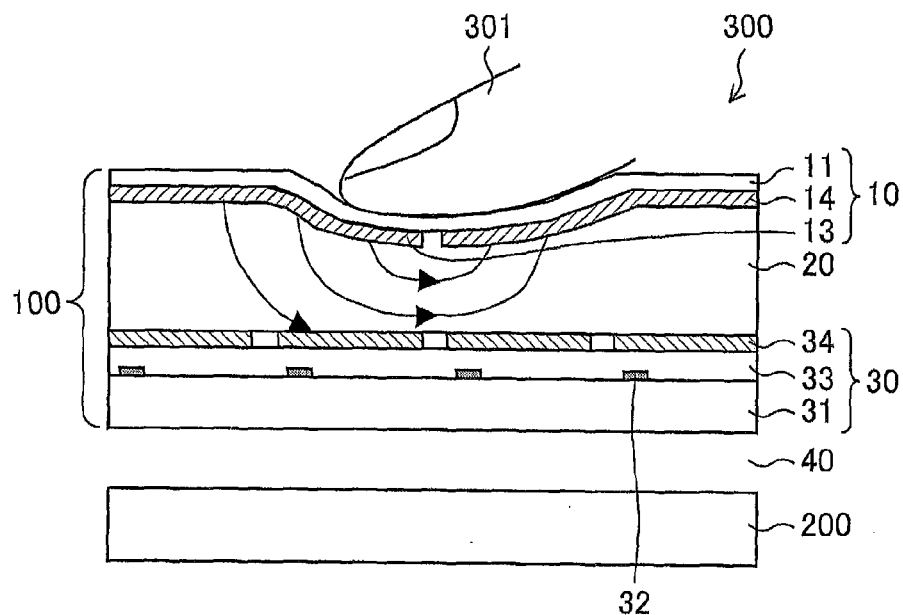
FIG. 14 is a cross sectional view of a liquid crystal display device equipped with a touch panel, for illustrating another example of the present invention. (a) of FIG. 14 is a cross sectional view illustrating a case where a protection film of a TP module is strongly pressed, while (b) of FIG. 14 is a cross sectional view illustrating a case where the protection film of the TP module is lightly touched.
Figure 14:
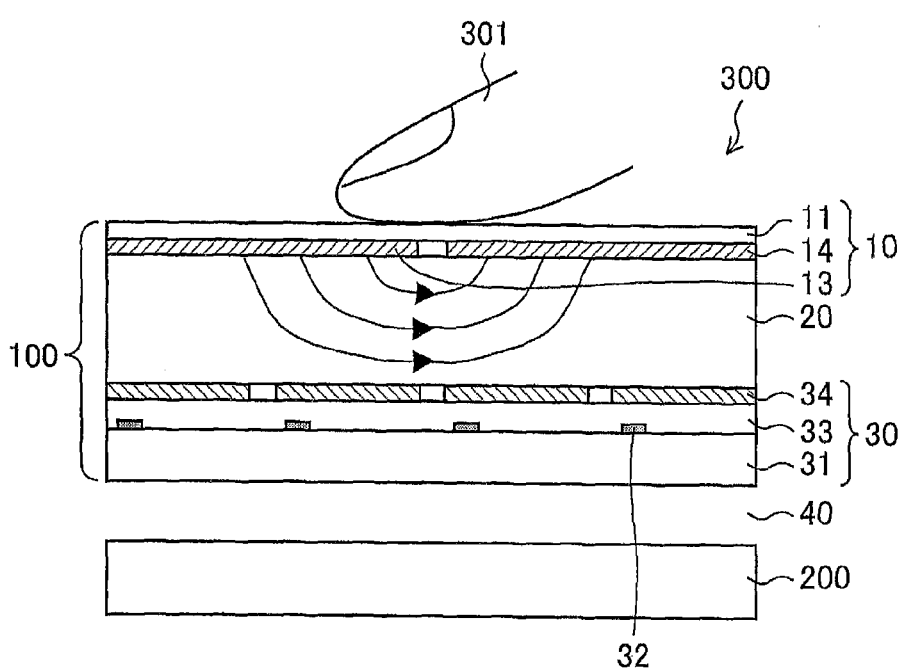

An operation example in accordance with an example of the TP module 100 of Embodiment 1 is described below with reference to FIG. 14. FIG. 14 is a cross sectional view of the liquid crystal display device 300 equipped with the touch panel in a state in which a pressure is being measured by the TP module 100 in accordance with Example 4. (a) of FIG. 14 is a cross sectional view illustrating a state in which the operation screen (protection film 11) is strongly pressed with a finger of the user 301, while (b) of FIG. 14 is a cross sectional view illustrating a state in which the protection film 11 is lightly touched with the finger of the user 301.

According to Example 4, the first electrode 12 is driven as in the case where the position detection function (described earlier) is carried out. In this case, as illustrated in (b) of FIG. 14, an electric field extending from the drive electrode 13 to the sensing electrode 14 of the first electrode 12 is formed also in the deformable layer 20 on an inner side (on a back surface side) of the first electrode 12. A thickness between the first electrode 12 and the second electrode 34 is reduced by a press with the finger. As a result, an electric field between the drive electrode 13 and the sensing electrode 14 (Drive-Sense electric field) is absorbed by a surface of the second electrode 34 (lower active matrix). This causes a reduction in Drive-Sense capacitance.

According to the TP module 100, a change (reduction) in capacitance means a signal. A touch causes an increase in signal due to a change in electric field which change occurs at an upper surface of the first electrode 12, whereas a press causes a further increase in signal due to a change in electric field which change occurs at a lower surface of the first electrode 12. Evaluation of such a signal amount allows determination of an amount of the press. This makes it possible to realize pressure sensing (hereinafter, also referred to as a pressure sensing function).

Example 5

Figure 15:
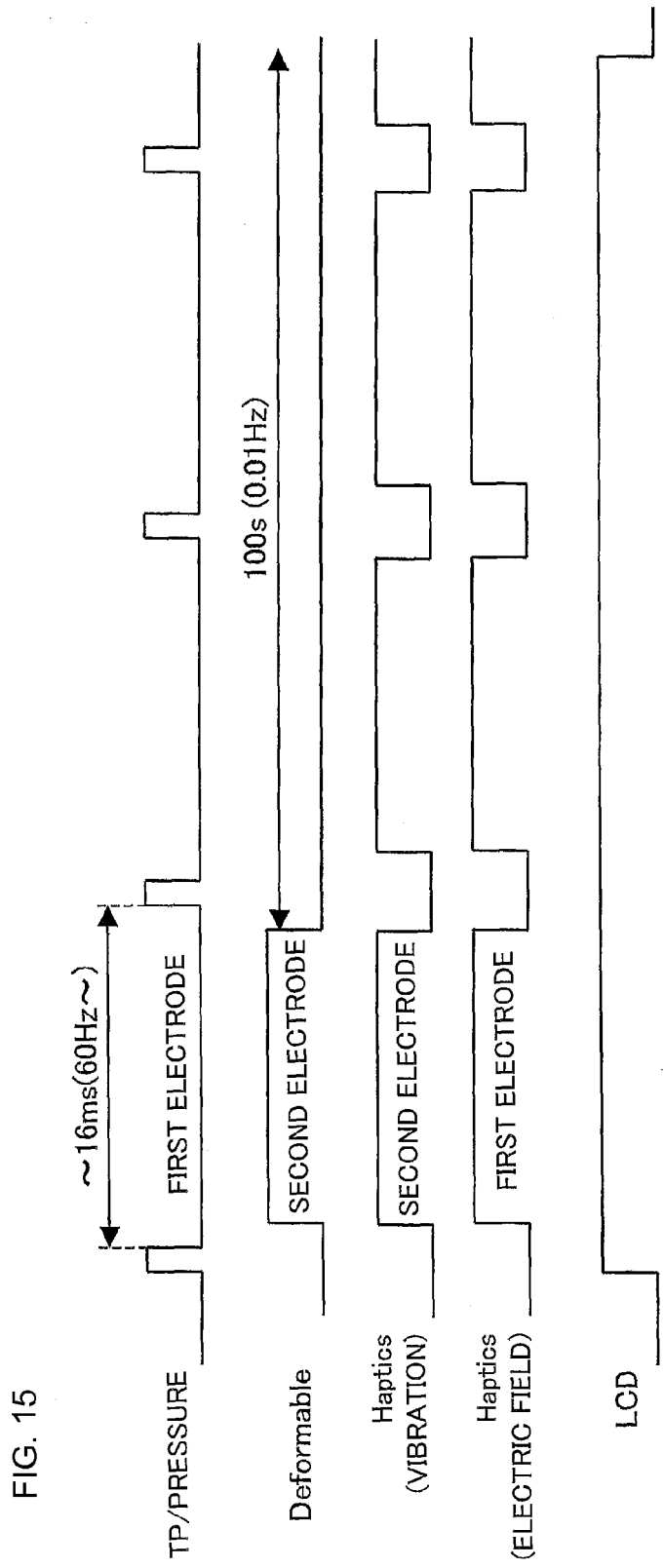
FIG. 15 is a timing chart illustrating a drive method of another example of the present invention.

An operation example in accordance with an example of the TP module 100 of Embodiment 1 is described below with reference to FIG. 15. FIG. 15 is a timing chart illustrating functions of the TP module 100 in accordance with Example 5. In a case where the TP module 100 is driven in accordance with Example 5, the functions of Examples 1 through 5 (described above) can be carried out by a single TP module 100 without giving a harmful influence such as noise to each other.

In FIG. 15, a period of an H (high) state indicates an operation period (detection period) in which a corresponding function is in operation, while a period of an L (low) state indicates a blanking period (pause period) in which a corresponding function is not in operation. The operation period and the blanking period are alternately repeated.

The TP module 100 of Embodiment 1 carries out the pressure sensing function by causing the first electrode 12 to carry out the position detection function as drive of a typical touch panel. That is, it is possible to simultaneously carry out the position detection function of Example 1 (described earlier) and the pressure sensing function of Example 4.

It is possible to carry out both the deformable function and the haptics vibration function regardless of the potential of the first electrode 12 by causing the control section to control a voltage applied between the first electrode 12 and the second electrode 34.

Here, in order to carry out the deformable function and the haptics vibration function, the control section applies a voltage to the deformable layer 20. In order to apply the voltage to the deformable layer 20, the control section needs to apply a high voltage between the first electrode 12 and the second electrode by setting the potential of the second electrode 34 to, for example, the high potential (HV).

Note, however, that the application of a high voltage between the first electrode 12 and the second electrode 34 in a period in which the position detection function is being carried out (during a drive period of the position detection function) causes a trouble to the position detection function.

Note also that a change in potential of the second electrode in the period in which the position detection function is being carried out causes noise to the position detection function.

Therefore, the deformable function and the haptics vibration function are preferably driven not simultaneously with the position detection function but at a different timing from the position detection function.

Specifically, a TFT 32 of each of the lower electrodes 34n of the second electrode 34 is preferably in a non-selected state during the drive period of the position detection function. No electric current flows between a source electrode and a drain electrode of a TFT which is in a non-selected state. This causes no change in potential of the lower electrodes 34n and causes no noise to the position detection function.

Note that a voltage of 0 V is preferably applied between the first electrode 12 and the second electrode 34 during the drive period of the position detection function.

For example, as illustrated in the timing chart of FIG. 15, a blanking period (pause period) of the position detection function and the pressure sensor function is provided. Then, during this blanking period, the deformable function and the haptics vibration function are carried out.

The drive period of the position detection function is preferably repeated at a frequency of, for example, 60 Hz or higher, for the following reason. In a case where the drive period of the position detection function is repeated at a frequency lower than 60 Hz and the detection target object moves on the detection screen of the TP module 100 at a high speed, a detection frequency is insufficient to smoothly detect a position.

Further, one blanking period is preferably less than 16 msec. This makes it possible to detect a position at a sufficient detection frequency. Further, such a blanking period makes it possible to ensure a sufficient detection period.

The blanking period and the drive period of the deformable function and the haptics vibration function can be repeated with a cycle time of, for example, 100 seconds.

In order to make the blanking period of the position detection function as long as possible, a drive period of the touch panel is preferably made shorter by carrying out parallel (concurrent) drive with respect to the drive lines DLn. The parallel drive does not mean sequentially driving the drive lines DLn one by one but means driving a plurality of drive lines DLn simultaneously. That is, the parallel drive means simultaneously inputting electric signals to a plurality of drive lines DLn.

By making the blanking period of the position detection function longer as described above, it becomes possible to ensure a long drive period of the deformable function and the haptics vibration function.

Figure 16:
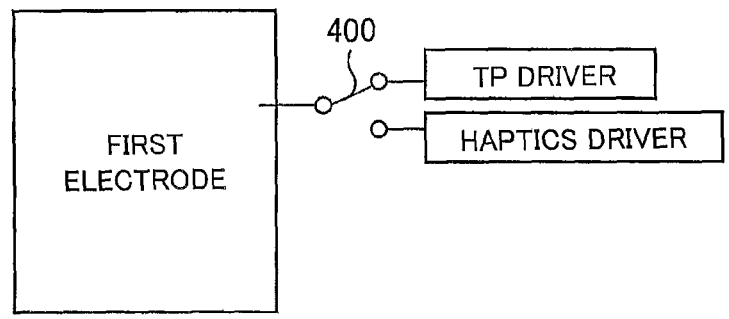
FIG. 16 is a conceptual diagram illustrating a method of controlling a first electrode of another example of the present invention.

FIG. 16 is a conceptual diagram illustrating a method of controlling the first electrode 12. As illustrated in FIG. 16, a driver for the position detection function and a driver for the haptics function are connected via a switch 400 to the first electrode 12 by the control section (not illustrated).

By carrying out the above-described drive, four functions, which are the position detection function, the pressure sensing function, the deformable function, and the haptics vibration function, can be carried out by a single TP module 100 without giving a harmful influence such as noise to each other.

Further, as illustrated in FIG. 15, the TP module 100 of the present invention makes it possible to realize haptic feedback provided by an electric field during the blanking period of the position detection function.

The haptic feedback by an electric field is provided to a user by applying a voltage of a sine wave of 1 Hz to several hundred Hz to the drive electrode 13 of the first electrode 12.

Embodiment 2

Figure 17:
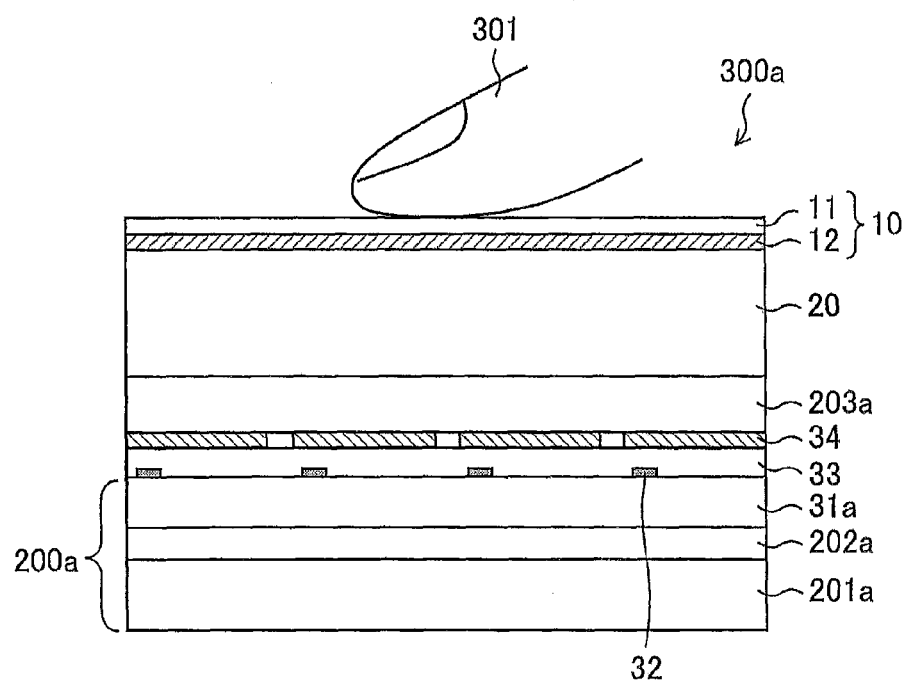
FIG. 17 is a cross sectional view illustrating a liquid crystal display device according to Embodiment 2 of the present invention equipped with a touch panel.

The following discusses another embodiment of a liquid crystal display device of the present invention equipped with a touch panel, with reference to FIG. 17.

Note that, for convenience of the present invention, each member having an identical function to that in drawings discussed in Embodiment 1 above is given the same reference sign and an explanation thereof is omitted.

FIG. 17 is a cross sectional view of a liquid crystal display device 300a according to Embodiment 2 equipped with a touch panel. As illustrated in FIG. 17, the liquid crystal display device 300a equipped with the touch panel is provided with TFTs 32 of a TP module 100a, above a glass substrate 31a on a color filter side of the liquid crystal display device 200a and on a back side of a polarizer 203a. Here, "above" means a display surface side of the liquid crystal display device 200a.

As compared to the liquid crystal display device 300 of Embodiment 1 equipped with the touch panel, one glass substrate becomes unnecessary in the liquid crystal display device 300a of Embodiment 2 equipped with the touch panel. Further, man-hours for bonding the glass substrate are also reduced. This makes it possible to realize cost reduction.

The liquid crystal display device 300a equipped with the touch panel can be driven by the same method as the liquid crystal display device 300 of Embodiment 1 equipped with the touch panel.

Embodiment 3

Figure 18:
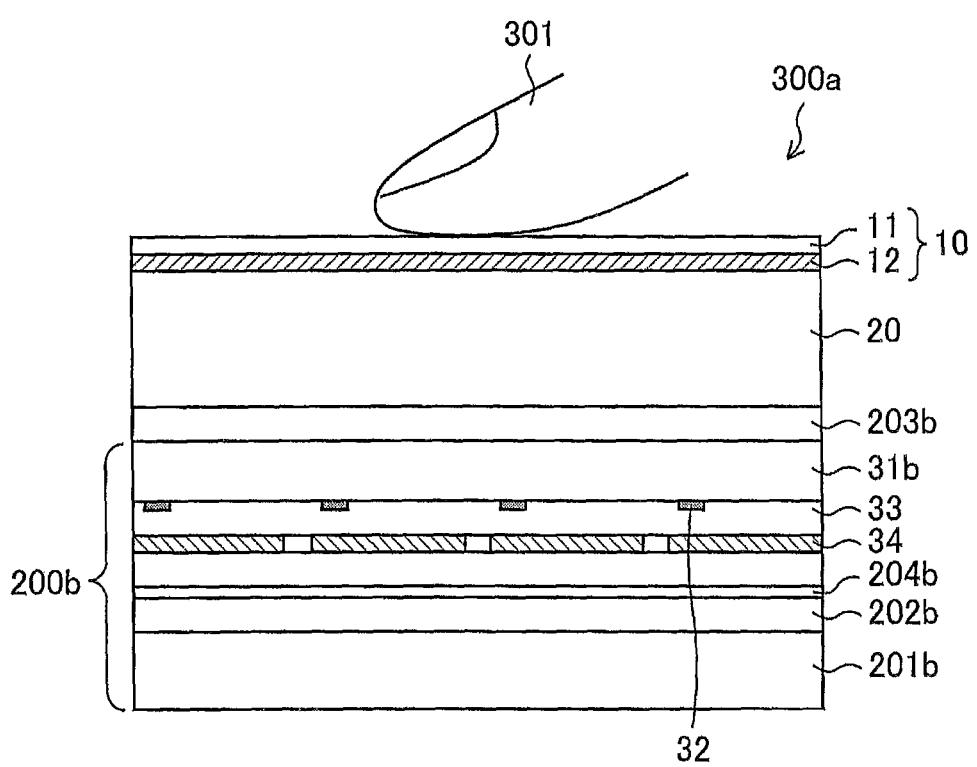
FIG. 18 is a cross sectional view illustrating a liquid crystal display device according to Embodiment 3 of the present invention equipped with a touch panel.
Figure 19:
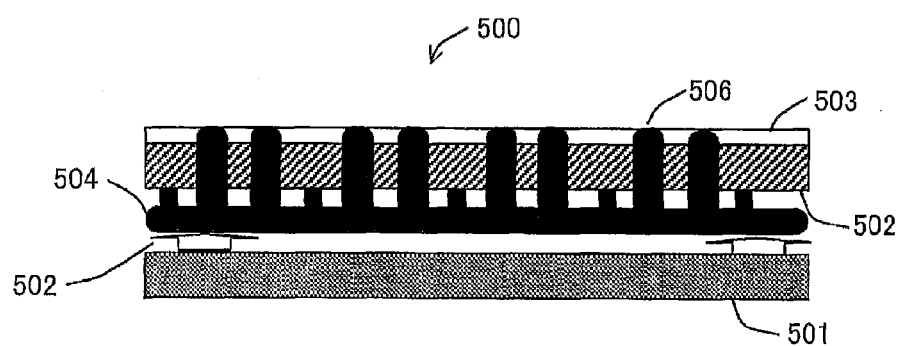
FIG. 19 is a cross sectional view of a conventional touch panel.
Figure 19:
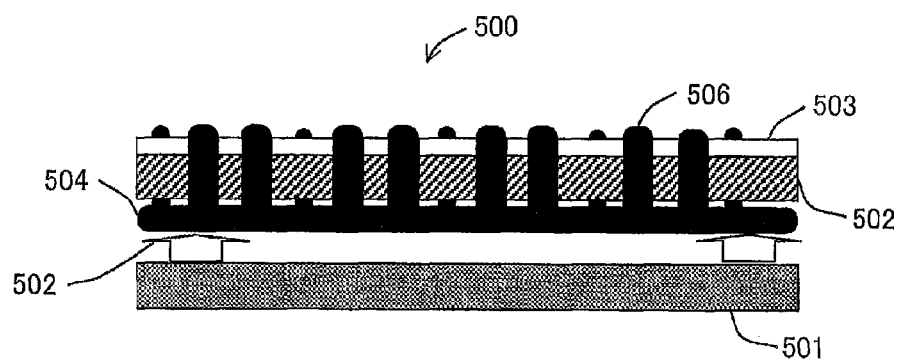

The following discusses another embodiment of a liquid crystal display device of the present invention equipped with a touch panel, with reference to FIG. 18.

Note that, for convenience of the present invention, each member having an identical function to that in drawings discussed in Embodiment 1 above is given the same reference sign and an explanation thereof is omitted.

FIG. 18 is a cross sectional view of a liquid crystal display device 300b according to Embodiment 3 equipped with a touch panel. As illustrated in FIG. 18, the liquid crystal display device 300b equipped with the touch panel is provided with TFTs 32 of a TP module 100b, on a back side of a glass substrate 31b on a color filter side of the liquid crystal display device 200b. Here, "back side" means a side opposite to a display surface side of the liquid crystal display device 200b.

As compared to the liquid crystal display device 300 of Embodiment 1 equipped with the touch panel, one glass substrate becomes unnecessary in the liquid crystal display device 300b of Embodiment 3 equipped with the touch panel. Further, man-hours for bonding the glass substrate are also reduced. This makes it possible to realize cost reduction.

Further, whereas it is required to form TFTs, electrodes, etc., on both side of the glass substrate 31a in the liquid crystal display device 300a of Embodiment 2 equipped with the touch panel, it is possible to form TFTs, electrodes, etc., on only one side of the glass substrate 31b in the liquid crystal display device 300b of Embodiment 3 equipped with the touch panel. This allows the liquid crystal display device 300b of Embodiment 3 to have superiority in handleability and yield of the glass substrate in a production process.

The liquid crystal display device 300b equipped with the touch panel can be driven by the same method as the liquid crystal display device 300 of Embodiment 1 equipped with the touch panel.

The present invention is not limited to the description of the embodiments above, but may be altered as appropriate by a skilled person within the scope of the claims. That is, the present invention encompasses an embodiment based on a proper combination of technical means modified as appropriate within the scope of the claims.

INDUSTRIAL APPLICABILITY

The present invention is applicable to a touch panel module, an electronic device including the touch panel module, and a method for driving the touch panel module.

REFERENCE SIGNS LIST 11 protection film (detection screen)
12 first electrode
13 drive electrode
14 sensing electrode
20 deformable layer (deformable member)
31a and 31b glass substrate (substrate)
32 TFT
34 second electrode
34n lower electrode
100, 100a, and 100b touch panel module
200, 200a, and 200b liquid crystal display device (display device)
300, 300a, and 300b liquid crystal display device (electronic device) equipped with a touch panel
301 user (detection target object)

The invention claimed is:

1. A method for driving a touch panel module for detecting a position of a detection target object,
    the touch panel including:
    a detection screen;
    a first electrode provided on a back surface of the detection screen;
    a second electrode provided so as to face the first electrode, the second electrode including a plurality of lower electrodes each being connected to a TFT as a switching element, the lower electrodes being arranged in a matrix form; and
    a deformable member that deforms in response to application of a voltage, the deformable member being provided between the first electrode and the second electrode,
    the position of the detection target object being detected relative to the detection screen, on a basis of an approach or a touch of the detection target object to the detection screen,
    the method comprising:
    in a pause period in which the position is not detected, deforming the detection screen, by applying the voltage to at least a portion of a region between the first electrode and the second electrode so as to deform a portion of the deformable member which portion corresponds to the portion of the region to which part the voltage is applied; and
    in a detection period in which the position is detected, setting the TFT in a non-selected state, wherein
    in the pause period, the voltage applied to the portion of the region is changed at a frequency in a range of 1 Hz to 500 Hz.

2. The method as set forth in claim 1, wherein:
    the voltage is applied to the portion of the region by subjecting the lower electrodes to active matrix drive.

3. A method for driving a touch panel module for detecting a position of a detection target object,
    the touch panel including:
    a detection screen;
    a first electrode provided on a back surface of the detection screen;
    a second electrode provided so as to face the first electrode, the second electrode including a plurality of lower electrodes each being connected to a TFT as a switching element, the lower electrodes being arranged in a matrix form; and
    a deformable member that deforms in response to application of a voltage, the deformable member being provided between the first electrode and the second electrode,
    the position of the detection target object being detected relative to the detection screen, on a basis of an approach or a touch of the detection target object to the detection screen,
    the method comprising:
    in a pause period in which the position is not detected, deforming the detection screen, by applying the voltage to a portion of a region between the first electrode and the second electrode so as to deform a portion of the deformable member which portion corresponds to the portion of the region to which part the voltage is applied; and
    in a detection period in which the position is detected, setting the TFT in a non-selected state, wherein in a case where the first electrode includes (i) a plurality of drive electrodes provided parallel to each other and (ii) a plurality of sensing electrodes that are provided parallel to each other and insulated from the drive electrodes via an insulator; and the drive electrodes and the sensing electrodes are orthogonal to each other in a matrix form, in the pause period, setting the first electrode to a constant potential; and in the detection period, changing potentials of the drive electrodes to detect the position on a basis of a change in static capacitance between the drive electrodes and the sensing electrodes.

4. A method for driving a touch panel module for detecting a position of a detection target object, the touch panel including:

a detection screen;

a first electrode provided on a back surface of the detection screen;

a second electrode provided so as to face the first electrode, the second electrode including a plurality of lower electrodes each being connected to a TFT as a switching element, the lower electrodes being arranged in a matrix form; and a deformable member that deforms in response to application of a voltage, the deformable member being provided between the first electrode and the second electrode, the position of the detection target object being detected relative to the detection screen, on a basis of an approach or a touch of the detection target object to the detection screen, the method comprising:

in a pause period in which the position is not detected, deforming the detection screen, by applying the voltage to a portion of a region between the first electrode and the second electrode so as to deform a portion of the deformable member which portion corresponds to the portion of the region to which part the voltage is applied; and in a detection period in which the position is detected, setting the TFT in a non-selected state, wherein:

the detection period and the pause period are alternately repeated; and the detection period is repeated at a frequency of 60 Hz or higher.

5. A method for driving a touch panel module for detecting a position of a detection target object, the touch panel including:

a detection screen;

a first electrode provided on a back surface of the detection screen;

a second electrode provided so as to face the first electrode, the second electrode including a plurality of lower electrodes each being connected to a TFT as a switching element, the lower electrodes being arranged in a matrix form; and a deformable member that deforms in response to application of a voltage, the deformable member being provided between the first electrode and the second electrode, the position of the detection target object being detected relative to the detection screen, on a basis of an approach or a touch of the detection target object to the detection screen, the method comprising:

in a pause period in which the position is not detected, deforming the detection screen, by applying the voltage to a portion of a region between the first electrode and the second electrode so as to deform a portion of the deformable member which portion corresponds to the portion of the region to which part the voltage is applied; and in a detection period in which the position is detected, setting the TFT in a non-selected state, wherein:

the detection period and the pause period are alternately repeated; and the pause period is less than 16 msec.

* * * * *